(No Model.) 2 Sheets—Sheet 1.

E. HUBER.
TRACTION ENGINE CLUTCH MECHANISM.

No. 586,664. Patented July 20, 1897.

Witnesses
Jas. E. Hawley
W. M. McNair

Inventor
Edward Huber,
By his Attorneys,
Toulmin and Whittemore.

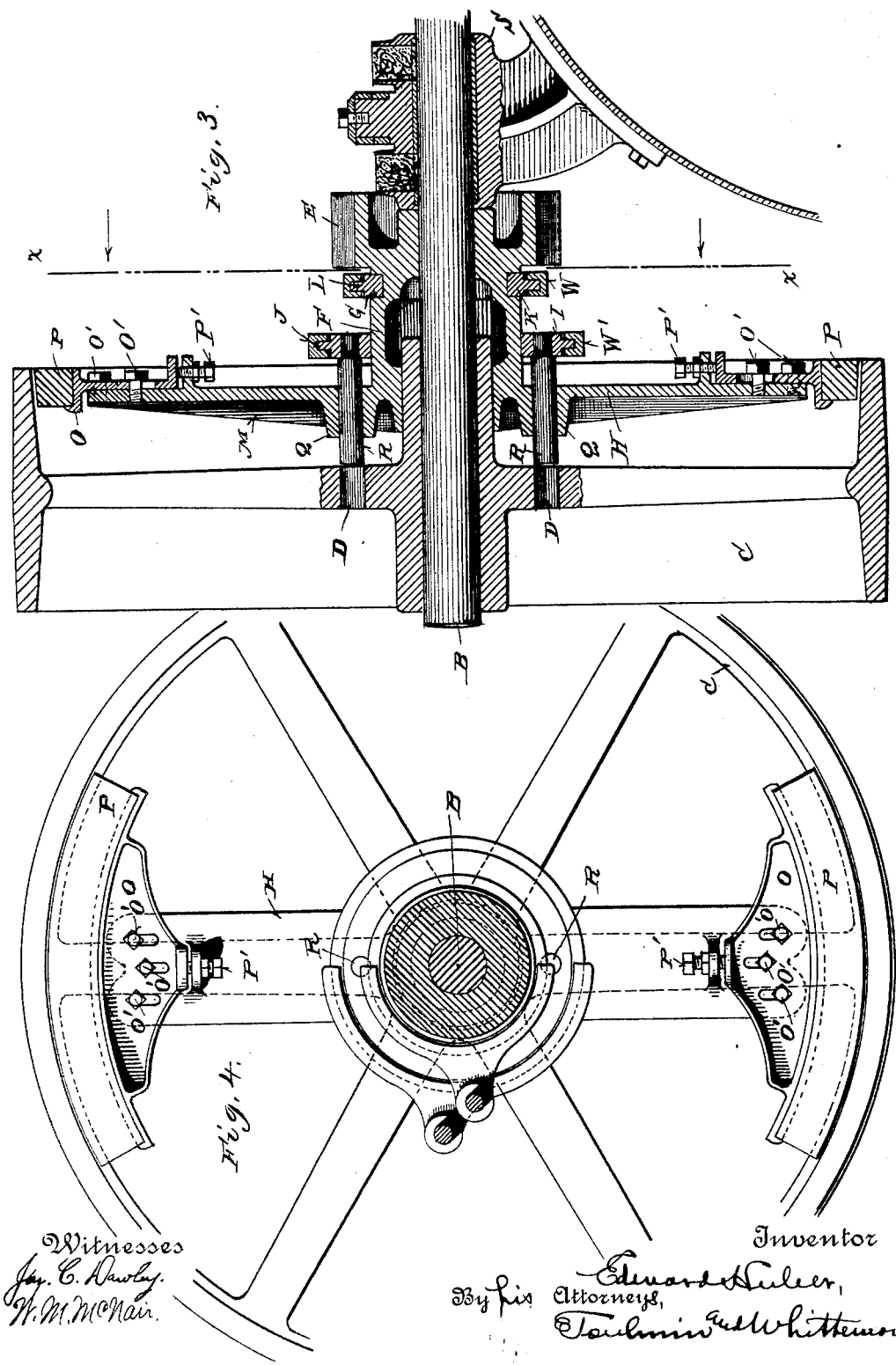

UNITED STATES PATENT OFFICE.

EDWARD HUBER, OF MARION, OHIO.

TRACTION-ENGINE CLUTCH MECHANISM.

SPECIFICATION forming part of Letters Patent No. 586,664, dated July 20, 1897.

Application filed May 25, 1896. Serial No. 592,915. (No model.)

*To all whom it may concern:*

Be it known that I, EDWARD HUBER, a citizen of the United States, residing at Marion, in the county of Marion and State of Ohio, have invented certain new and useful Improvements in Traction-Engine Clutch Mechanism, of which the following is a specification, reference being had therein to the accompanying drawings.

This invention relates to improvements in combined friction and positive clutch mechanism for traction-engines.

I am aware that it is not at this time new to employ friction-clutches and positive clutches to first frictionally engage and then positively engage driving-shafts with wheels from which power is transmitted; but my invention relates to a peculiar combination in which a driving-pinion and a friction-clutch are connected, so that when the pinion is shifted laterally the clutch shifts with it, and a positive clutch connected to rotate with the pinion, but slidable laterally independently of the pinion and friction-clutch. By this arrangement I can frictionally engage the pinion with the balance-wheel on the driving-shaft and then independently engage the pinion positively with such wheel by means of the independent positive clutch, and then I can independently disengage either the friction-clutch or the positive clutch from the wheel.

Figure 1:
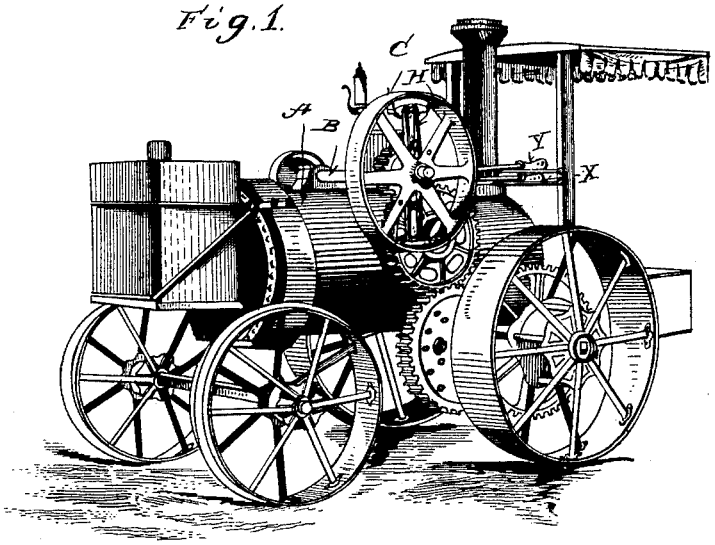
Figure 2:
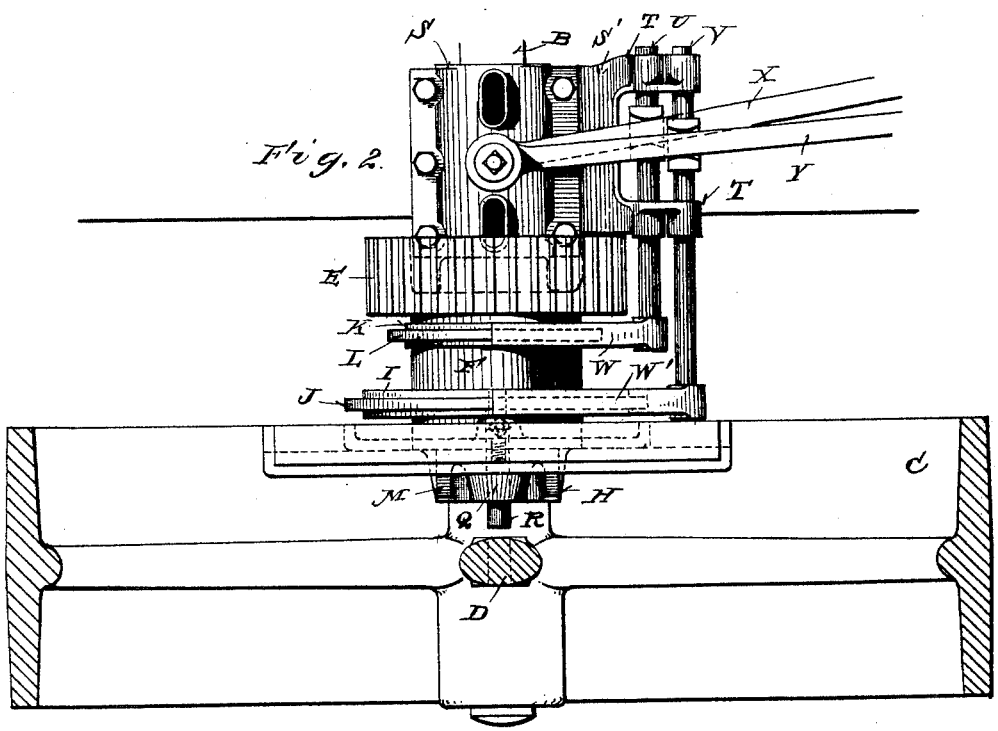

In the accompanying drawings, forming a part of the specification and in which like reference-letters indicate corresponding parts, Figure 1 is a perspective view of a traction-engine embodying my invention. Fig. 2 is an enlarged detached plan view of the clutch mechanism. Fig. 3 is a vertical central section through the clutch, showing relation of the parts; and Fig. 4 is a section on line *x x*, Fig. 3, illustrating the manner in which the spider engages the pulley-wheel.

The letter A represents an ordinary traction-engine boiler supported upon the usual wheeled frame, and B the engine-shaft, upon one end of which is arranged the usual balance-wheel C, provided near its center with two diametrically opposite apertures or slots D, the functions of which will be hereinafter described.

E is a driving-pinion adapted to engage with the usual traction-engine gearing, loosely sleeved upon the engine-shaft.

F is a hub preferably formed integral with the pinion, the free end of which is sleeved over the hub of the balance-wheel C. The hub F is provided with an annular recess G in immediate proximity to the pinion and carries at its free end a spider H. Upon the hub, adjacent to the spider, is loosely sleeved a collar I, which collar is provided with a cylindrical flange J.

K is a collar similar to the collar I, located in the recess G and provided with a corresponding cylindrical flange L.

The spider H comprises radial spokes or arms H', provided with strengthening-webs M. Upon these arms, preferably two in number and diametrically opposite, are arranged brackets O, adjustably secured to the arms and adapted to receive and carry the friction-shoes P. Bolts O' and P' hold and adjust these brackets. These shoes in contour are preferably arcs of circles corresponding in form to the interior rim of the balance-wheel. The outer portion of the shoe is beveled to correspond to a bevel upon the interior of the wheel-rim with which it is adapted to frictionally engage, as plainly shown in Fig. 3. Upon the body of the spider, diametrically opposite each other and opposite apertures D in the balance-wheel, are arranged extensions or lugs Q. These lugs are apertured to register with apertures D, and are adapted to receive pins R, fixedly secured in the collar I.

Upon a bearing S of the engine-shaft is a frame S', provided with outwardly and upwardly projecting arms T, which form bearings for shafts U and V, arranged one above the other, as plainly shown in Fig. 2.

W is a semicircular connecting-bar rigidly attached to the free end of the shaft U and grooved upon its inner face to embrace a portion of the cylindrical flange L. W' is a similar connecting-piece attached in a similar manner to the free end of the shaft V and adapted to engage the flange J on the collar I.

X and Y are shifting levers pivoted to the bearing S. By means of these shifting levers lateral movement may be transmitted to the shafts U and V, which in turn transmit lateral motion respectively to the friction and positive clutches.

The parts having been thus described, the operation of the same is as follows: The engine is started up and the shaft is given a high speed, together with the balance-wheel, while the machine as a whole is standing still. When proper momentum of the balance-wheel is obtained, the operator, by shifting over the lever-arm X, puts the friction-shoes arranged upon the spider in frictional engagement with the rapidly-revolving wheel. As soon as the inertia of the pinion is overcome and the same commences to revolve slowly the lever-arm Y is shifted over, which throws the pins R, carried by the collar I, into the apertures or slots D in the wheel, thus positively locking the parts together. When it is desired to disengage the clutch, the operator simply reverses the movements of the lever-arms, which gives the desired result.

It will also be understood that this clutch may be used on engines whether the driving-gear is direct or differential.

In using the term "balance-wheel" or "band-wheel" it will be understood that I include any device carried by the engine or driving-shaft with which the friction-clutch and positive clutch may be engaged.

Thus, as intimated in the preamble, my improved combination resides, essentially, in connecting together the driving-pinion and the friction-clutch and in making them slidable to and from the balance-wheel, and in the friction-clutch mounted to travel rotatably with said pinion, but independently slidable with respect to the pinion and friction-clutch, so that the friction-clutch by shifting the pinion laterally can be engaged and disengaged with and from such wheel, and the positive clutch independently engaged with and disengaged from the said wheel, whereby the pinion, through the friction-clutch, can be connected with said wheel frictionally and then positively, and then whereby either of the clutches may be disengaged independently of the other from such wheel.

It is to be further noticed that in the construction of the device herein described and set forth the friction-clutch and a driving-pinion secured thereto by means of the hub F are in one piece, and upon this hub, intermediate the clutch and the driving-pinion, the positive clutch is arranged.

This mechanism forms a compact and effective device which is easily and cheaply manufactured and comprises but very few parts.

Having thus described my invention, what I claim, and desire to secure by Letters Patent, is—

1. The combination with a traction-engine driving-shaft and a balance-wheel fixedly secured thereto, a hub F carrying integral therewith, at one end, a driving-pinion, and at the other end a friction-clutch, said hub having on it, in a guide, an adjusting-collar for the hub itself, and being further provided with a cylindrical portion upon which is slidingly supported a second collar carrying pins which form a positive clutch, the pins connected to the sliding collar being slidingly supported in bearings in the frame of the friction-clutch, and the balance-wheel having bearings in which the pins engage, substantially as set forth and described.

2. The combination with a traction-engine driving-shaft and a balance-wheel fixedly secured thereon having an inwardly-extending hub, the hub F having its inner end loosely sleeved upon the driving-shaft and its outer end sleeved upon the inwardly-extending hub of the balance-wheel, a driving-pinion integral with the hub F at one end, and a friction-clutch integral with the hub at the other end, said hub having on it, in a guide, an adjusting-collar for the hub itself, and being further provided with a cylindrical portion upon which is slidingly supported a second collar carrying pins which form a positive clutch, the pins connected to the sliding collar being slidingly supported in bearings in the frame of the friction-clutch, and the balance-wheel having bearings in which the pins engage, the supporting-arms T, guide-shafts slidingly supported in bearings in said arms, connections between the guide-shafts, and the collars upon the hub F, and levers secured to the guide-shafts, substantially as described.

In testimony whereof I affix my signature in presence of two witnesses.

EDWARD HUBER.

Witnesses:
JOHN J. CRAWLEY,
JOHN A. SCHROETER.